Sept. 11, 1956        M. F. KNOY        2,762,360
GAS RANGE
Filed April 28, 1951        2 Sheets-Sheet 1
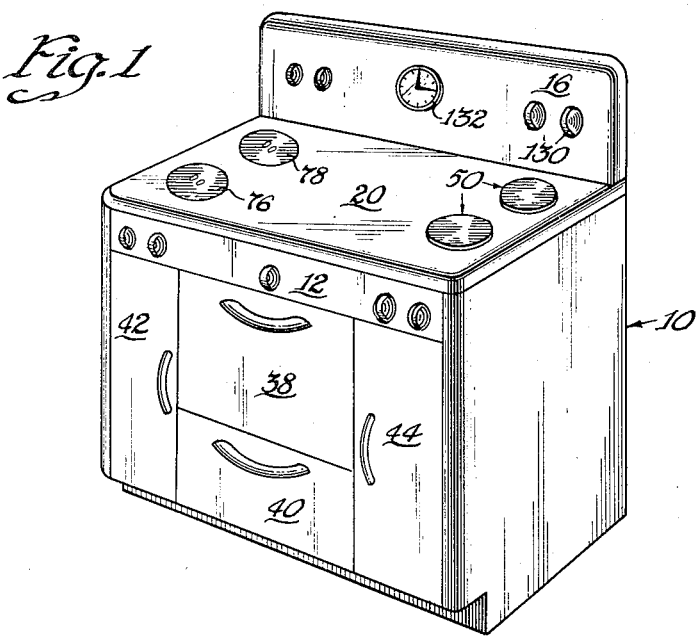
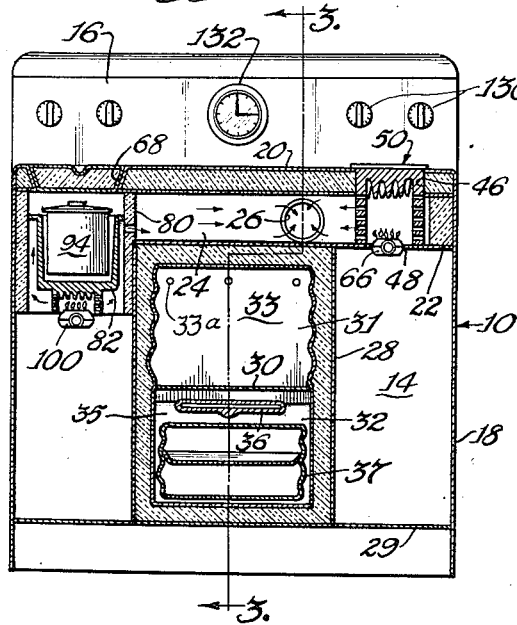
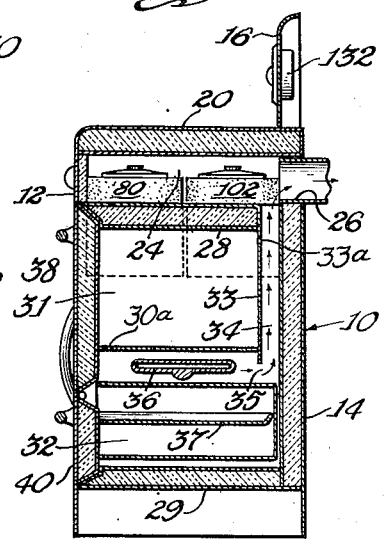
Inventor
M. Frank Knoy
by Bair, Freeman & Molinare
Attorneys Sept. 11, 1956 M. F. KNOY 2,762,360
GAS RANGE
Filed April 28, 1951 2 Sheets-Sheet 2
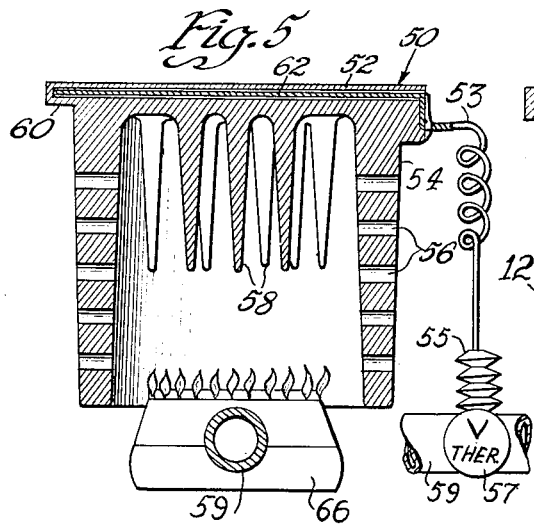
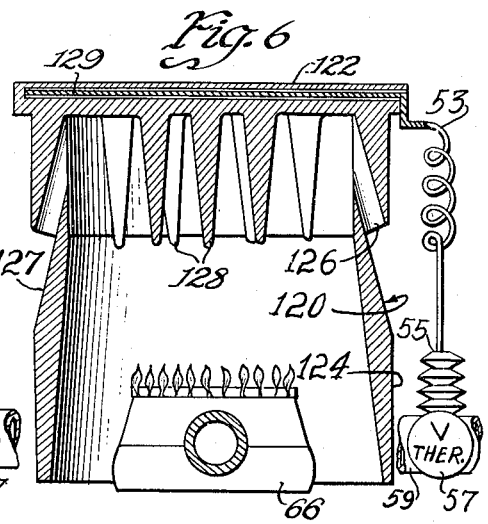
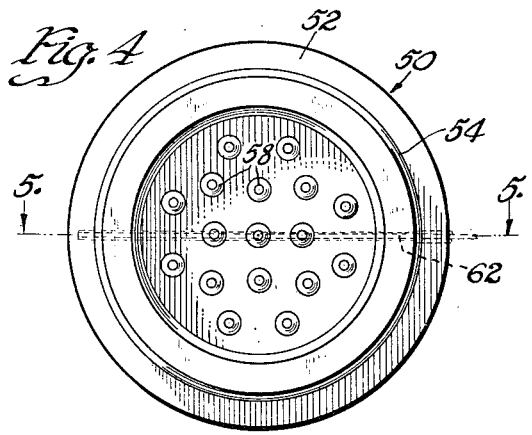
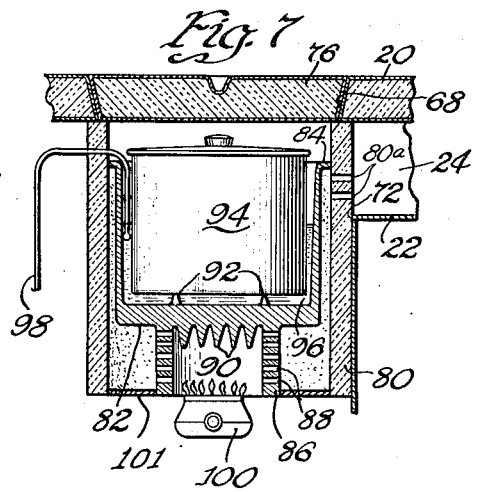
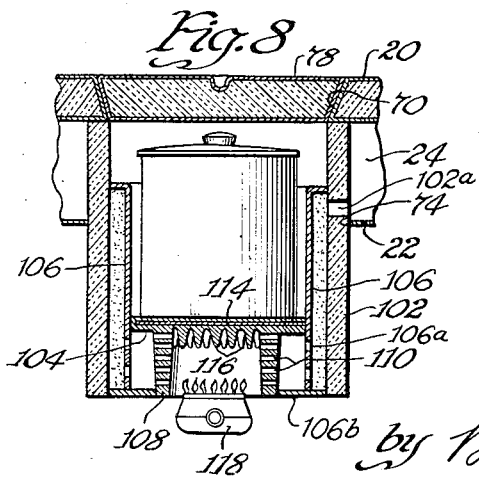

United States Patent Office 2,762,360
Patented Sept. 11, 1956

2,762,360

GAS RANGE

Marion Frank Knoy, Cohasset, Mass., assignor to The Institute of Gas Technology, Chicago, Ill., a corporation of Illinois Application April 28, 1951, Serial No. 223,614

5 Claims. (Cl. 126—39)

This invention relates to gas ranges and burners for such ranges.

In the operation of a conventional gas range, hot combustion gases are liberated that contain about one-half of the heat generated. Since these hot combustion gases escape directly into the kitchen, overheating of the kitchen may be effected whenever a conventional gas range is operated for some length of time. Further, the combustion gases rise around and about the cooking vessels and then pick up and carry along grease and vapor from the food being cooked. Such grease and vapor are then condensed and deposited in the cooler kitchen areas. Cooking odors are also picked up and disseminated by the combustion gases. The direct exposure of the cooking vessels to the gas flames often leads to warping of the cooking vessels due to uneven heating of the latter.

Another disadvantage of a conventional gas range is the fact that such ranges are not adapted for thermostatic control of cooking temperatures so that unless cooking is supervised more or less constantly, even after the gas supply to the burners has been adjusted manually at the time when the desired cooking temperature has been reached, the food is liable to be overcooked or scorched or to boil over.

It is, therefore, an important object of the present invention to provide a gas range free of the above noted disadvantages and, more particularly, to provide a gas range having burners constructed for indirect heating of the cooking vessels and provided with insulated flues for venting the combustion products outside the kitchen so that the operation of the gas range will not cause overheating of the kitchen or the dissemination of cooking odors, vapors and grease in the kitchen.

Another important object of this invention is to provide a gas range of the type indicated having burners constructed for indirect heating of the cooking vessels and adapted for thermostatic temperature control.

A further important object of this invention is to provide improved gas burners suitable for use in a gas range.

Other and further objects and features of this invention will become apparent from the following description and appended claims as illustrated by the accompanying drawing showing, by way of examples, a gas range and burners according to this invention. More particularly:

Figure 1 is a perspective view of a gas range according to this invention having a rectangular top and provided with four burners arranged at the corners of the range top;

Figure 2 is an enlarged vertical longitudinal cross sectional view of the range of Figure 1 taken through the middle of the front burners;

Figure 3 is an enlarged vertical cross sectional view taken along the line 3—3 of Figure 2;

Figure 4 is a greatly enlarged bottom plan view of one of the top burner plates of the range of Figure 1;

Figure 5 is a greatly enlarged cross sectional view taken along the line 5—5 of Figure 4;

Figure 6 is a greatly enlarged vertical cross-sectional view similar to Figure 5 but showing another top burner plate of modified construction;

Figure 7 is a greatly enlarged vertical cross sectional view through a well cooker forming part of the range of Figure 1; and Figure 8 is a greatly enlarged vertical cross sectional view through another well cooker forming part of the range of Figure 1.

In Figures 1 to 3, a gas range according to the present invention is generally indicated by the reference numeral 10. As shown, this range is of cabinet form and includes a front wall 12, a rear wall 14 projecting above the top of the range to define a back splash 16, side walls 18, and a top panel 20. Within the range, a partition 22 extends between the front, rear and side walls in spaced relationship to the top panel 20 to define a flue space 24 immediately below the top panel 20. The whole of the top panel 20 as well as the parts of the front wall 12, of the rear wall 14 and of the side walls 18 above the partition 22 include a layer of insulating material serving to minimize the escape of heat from the walls of the flue space 24. The rear wall 14 is formed with an aperture 26 for venting the flue space outside the kitchen, as through any suitable pipe or conduit (not shown).

In the middle of the range, an oven 28 having walls of insulating material, extends from the bottom 29 of the range to the partition 22. This oven is subdivided by a transverse partition 30 into an upper oven compartment 31 and a lower oven compartment 32. Further, a vertical partition 33 at the rear of the upper oven compartment 31 defines a vertical flue space 34 extending a short distance below the partition 30 and communicating with the lower oven compartment 32 through a horizontal slot 35. Vents 30a and 33a are provided, respectively, in the partition 30 and the partition 33, to permit escape of steam from the oven 28 into the vertical flue space 34. A gas burner 36 is disposed in the upper part of the compartment 32, and a broiler 37 in the lower part thereof.

As shown in Figures 1 and 3, the front wall 12 extends downwardly to the level of the partition 22. Below the front wall 12, the range is closed by hinged doors 38, 40, 42 and 44, affording access, respectively, to the upper oven compartment 31, to the lower oven compartment 32, to the space between the left side wall 18 and the oven 28 and to the space defined between the right side wall 18 and the oven 28.

To the right of the oven 28, the top panel 20 is formed with front and rear apertures 46 and the partition 22 is formed with front and rear apertures 48 aligned with the apertures 46. In each of the apertures 46 there is fitted a burner plate generally indicated at 50 and shown in greater detail in Figures 4 and 5. More particularly, this burner plate is of inverted cup shape, and includes a disc shaped top plate 52 together with a tubular side wall 54 extending down to the partition 22 and surrounding the partition aperture 48. Note that this latter aperture is smaller than the top plate aperture 46. The side wall 54 is formed with a plurality of apertures 56 and the top plate 52 may have a number of spikes or fingers 58 depending therefrom. Further, the top plate 52 has a peripheral flange 60 overlying the margins of the top plate aperture 46. A thermosensitive element 62, preferably of the type responding to temperature changes by the expansion or contraction of a solid or liquid medium, is disposed in a horizontal well extending within and across the upper part of the burner plate 52. The well may connect to a capillary tube 53 which in turn leads to a bellows 55 comprising part of the thermostatic valve 57 in the gas line 59. The valve is adapted to close or open as the bellows expands or contracts due to expansion or contraction of the liquid inside the capillary tube.

Any other suitable thermostatic valve regulator may be employed for this purpose.

A gas burner 66 is disposed in or at the partition aperture 48 so that flames therefrom will rise within the burner plate side wall 54 and impinge upon the lower surface of the burner plate 52. The latter is suitably made of cast aluminum, cast iron or rolled or machined stainless steel or the like.

To the left of the oven 28, the top plate 20 is formed with a front circular aperture 68 and a rear circular aperture 70 and the partition 22 is formed with circular apertures 72 and 74 aligned, respectively, with the apertures 68 and 70. Removable covers 76 and 78 serve to close the apertures 68 and 70 below which well cookers are provided, as explained hereinbelow.

As best shown in Figure 7, a tubular member 80 including insulating material is fixedly mounted in the front aperture 72 in the partition 22, to project above the latter up to the top panel 20 and also below the partition 22. The tubular member 80 merges with the insulated portion of the left side wall 18 above the partition 22. A cup-shaped metal cooker 82 is suspended in the tubular member 80 in spaced relationship to the latter by means of an upper flange 84 fixedly connected to the tubular member 80 at a level between the top panel 20 and the partition 22. The cooker 82 is formed with a depending generally tubular bottom flange 86 pierced by apertures 88. Spikes 90 may depend from the cooker bottom inside the flange 88. Projections 92 in the upper bottom side of the cooker 82 serve to support a cooking vessel 94 in spaced relationship to the cooker 82. The latter contains a liquid heat transfer medium 96 which may be water. A thermosensitive element 98 is disposed within the cooker 82 and may be immersed in the liquid heat transfer medium 96. The flange 86 may terminate flush with the lower edge of the tubular member 80. A gas burner 100 is disposed immediately below the flange 86 so that its flame will rise and impinge upon the bottom of the cooker 82 within the flange 86. An annular partition 101 may extend from the outside of the flange 86 to the inside of the member 80 below the apertures 88. Further, radial apertures 80a are formed in the member 80 between the partition 22 and the flange 84.

As best shown in Figure 8, a tubular member 102 including insulating material is inserted in the left rear aperture 74 in the partition 22 similarly to the tubular member 80 and, like the latter, merges with the left side wall 18 above the partition 22. A metal burner plate 104 of inverted cup shape is supported within the lower part of the tubular member 102 in spaced relationship thereto, by means of a tubular member 106 having an upper radial flange attached to the tubular member 102 between the partition 22 and the top panel 20. The burner plate 104 is formed with a depending tubular side wall 108 that may terminate flush with the lower edge of the tubular member and is perforated by apertures 110. The burner plate 104 has a thermosensitive element 114 disposed in a horizontal well therein. Depending spikes 116 are formed on the bottom of the burner plate 104. A gas burner 118 is disposed at the mouth of the burner plate 104 so that the flame rising from the burner may impinge upon the bottom of the burner plate 104 within the side walls 108. An annular plate 106b may close the bottom of the space between the tubular member 102 and the side wall 108. The tubular member 106 is formed with radial apertures 106a immediately below the plate 104, and radial apertures 102a are formed in the tubular member 102 between the partition 22 and the upper flange of the tubular member 106.

A burner plate of a somewhat different construction that may be substituted for the plates 50 or 104 is generally indicated by the reference numeral 120 in Figure 6. The plate 120 is generally of inverted cup shape, being formed with an upper plate or bottom portion 122 projecting radially beyond a depending tubular flaring side wall 124 having a series of spaced perforations 126 extending at an angle of about 75° with the plate 122 and terminating inwardly at or near the plate 122, and outwardly in a circumferential generally V-shaped groove 127 in the side wall 124. The lower wall of the groove 127 is aligned with the perforations 126 to facilitate venting of flue gases. The perforations 126 may be of alternating relatively large and small cross sectional area. Spikes 128 may depend from the bottom of the plate 122 within the side wall 124. A thermosensitive element 129 is disposed in a horizontal well in the plate 122.

If desired, the flange 86 may be constructed similarly to the side wall 124 of the burner plate 120.

Each of the gas burners 66, 100 and 118 is provided with a pilot light (not shown) or any other suitable conventional igniting device.

The thermosensitive elements 62, 98, 114 and 129 are connected to operating devices for valves that control the flow of gas to the gas burners so that the temperature in the plates 52, 104 or 122 and in the heat transfer medium 96 may be automatically maintained at any predetermined level. The thermostatic device shown and described above in conjunction with Figure 5 is suitable for use with thermosensitive elements 98, 114 and 129 as well as with the element 62 of Figure 5.

Referring now to Figure 1, the back splash 16 may have mounted thereon an adjustable time control means 130 for each of the plates 50 and 104 and for the well cooker 82, so that the gas supply to the gas burners for the plates and well cookers may be automatically shut off after a predetermined time interval. A clock 132 in the back splash 16 may actuate the time control means 130. Since such devices are well known, there is no need to disclose the exact construction thereof in this application.

It will be noted that in the operation of the above disclosed range, the combustion gases from the burners 66 escape into the flue space 24, as do also the combustion gases from the burners 100 and 118 which pass, respectively, through the apertures 80a and 102a in the tubular members 80 and 102 into the flue space 24. Likewise, the combustion gases from the oven burner 36 and the oven vent gases pass through the flue space 34 into the flue space 24. Since the latter is vented outside the kitchen, neither the heat content of the combustion gases nor any vapor, grease or cooking odors are disseminated by the combustion gases into the kitchen. Note that all outside range surfaces contacted by combustion gases are insulated, so that the top of the range is actually cool while being used for cooking.

When cooking is done on the plates 50, proper setting of the thermostats will just maintain boiling temperature but will not provide sufficient heat to boil any considerable amount of water. What little steam is found will be condensed on the lid of the pot. Thus, neither steam nor cooking odors, or grease carried by steam, will escape into the kitchen.

The cooking vessels are not directly exposed to any gas flames and are therefore not subject to warping due to uneven heating. Even if the cooking vessels should be overheated so as to cause the contents to boil over, the gas flames will not be extinguished.

The function and advantages of the burner plates disclosed hereinabove deserve particular discussion. In the operation of the burners 66, 100 and 118, the primary air for the combustion of the gas is admixed with the gas in the burners themselves, by any suitable conventional means. Secondary air required for completing the combustion enters the spaces within the depending flanges or side walls 54, 86, 108 and 124 between the latter and the burners. For supplying such secondary air, the bottom 29 may be perforated outside the oven 28. The combustion gases are vented, respectively, through the apertures 56, 88, 106a, 110 and 126. These apertures, together with the spikes or fingers 58, 90, 112 and 128 permit rapid heat absorption by the plate from the combustion gases. The inclined apertures 126 of the plate 120 of Figure 7 permit more rapid venting of combustion gases and therefore also a more rapid flow of secondary air into the combustion zone with resultant generation of more heat in the combustion zone.

Tests have been carried out with the burner plate of Figure 6 to illustrate the efficiencies obtainable with the plates of this invention. These tests were carried out according to the method of the American Gas Association. More particularly, one burner plate was constructed of cast aluminum and another of high silicon cast iron. A comparison was made between a new cast aluminum pot and an old warped sheet aluminum pot. The contact of this old pot with the burner plate was quite poor. The tests were carried out under the conditions prevailing in the range disclosed hereinabove and, in particular, without any contact of the flue gases with the pots. The results are tabulated hereinbelow. The "total efficiency" referred to in the table was obtained by including the heat consumed in evaporating water after the gas flame was turned off at the conclusion of the regular cold start test.

| Type of Plate | Type of Test | Type of Pot | Gas Rate, B.t.u./Hr. | Efficiency, Percent | | Boiling Time, Minutes |
|---|---|---|---|---|---|---|
| | | | | Up to 200° F. | Total | |
| aluminum | cold start | sheet | 6,250 | 32.1 | 44 | 23 |
| Do | do | cast | 7,250 | 36.8 | 48.8 | 20.5 |
| Do | hot start | sheet | 6,350 | 54.6 | | 15 |
| Do | do | do | 6,150 | 55.2 | | 15 |
| Do | do | cast | 8,180 | 58.7 | | 12 |
| iron | cold start | do | 8,200 | 28 | | 23 |
| Do | hot start | do | 7,840 | 46 | | 15.5 |
| Do | do | sheet | 7,750 | 39 | | 16.3 |

It will be noted that the difference in efficiency between the new cast aluminum pot (which had an extended area of contact with the plate) and the old warped sheet pot (which had poor contact with the plate) amounted to only a few per cent. Thus, the burner plates of this invention can be used for indirectly heating old or new pots.

Many details of construction may be varied within a wide range and it is therefore not my intention to limit the patent granted on this invention otherwise than necessitated by the scope of the appended claims.

I claim:

1. A gas range of cabinet form comprising front, rear and side walls, a top panel having a plurality of apertures therethrough, a transverse partition extending between said front, side and rear walls to define a flue space below said top panel, a vent for said flue space, said partition being formed with apertures aligned with said top panel apertures, a burner plate of inverted cup shape having a depending perforated side wall and seated in one of said top panel apertures with said perforated side wall extending in said flue space, a gas burner disposed at the opening of said cup-shaped burner plate, an open-ended tubular structure seated in and projecting below one of said partition apertures, said tubular structure including an upper portion extending to said top panel and formed with radial apertures, a cup-shaped container having an upper radial flange attached to said upper portion of said tubular structure above the radial apertures therein, a tubular perforated flange depending from the bottom of said container within and spaced from said tubular structure, a gas burner disposed at the lower opening of said tubular flange, an oven structure below said partition, a transverse partition in said oven subdividing said oven into upper and lower compartments, a gas burner disposed in said lower compartment, a vent conduit connecting said lower compartment with said flue space, insulating material covering the top and sides of said flue space, said oven and said vent conduit, and an insulating closure member removably seated in the top panel aperture aligned with said cup-shaped container.

2. A gas range of cabinet form comprising front, rear and side walls, a top panel having a plurality of apertures therethrough, a transverse partition extending between said front, side and rear walls to define a flue space below said top panel, a vent for said flue space, a layer of insulating material covering said top panel and covering said front, rear and side walls above said partition, said partition being formed with apertures aligned with said top panel apertures, a burner plate of inverted cup shape having a depending perforated side wall seated in one of said top panel apertures with said perforated side wall extending in said flue space toward one of said partition apertures, a gas burner disposed at the opening of said cup-shaped burner plate, an open-ended tubular insulated structure seated in another partition aperture and having an upper perforated portion extending to said top panel, a removable cover for the top panel aperture aligned with said other partition aperture, a second burner plate of inverted cup shape having a depending perforated side wall disposed in said tubular structure in spaced relationship thereto, a second gas burner disposed at the opening of said second cup-shaped burner plate, an insulated oven structure below said partition, a transverse partition subdividing said oven into upper and lower compartments, a gas burner disposed in said lower compartment, a vent conduit connecting said lower compartment with said flue space, thermosensitive elements in said burner plates, and means controlled by said thermosensitive elements for regulating the gas supply to said burners associated with said burner plates.

3. A gas range of cabinet form comprising front, rear and side walls, a top panel having an aperture therethrough, a transverse partition extending between said front, side and rear walls to define a flue space below said top panel, a vent for said flue space, said partition being formed with an aperture aligned with said top panel aperture, a layer of insulating material extending over the top and sides of said flue space, a burner plate of inverted cup shape seated in said top panel aperture and having a depending tubular perforated side wall extending in said flue space, a gas burner at the opening of said burner plate, a thermosensitive element in said burner plate, and means controlled by said thermosensitive element for regulating the gas supply to said burner.

4. A gas range of cabinet form comprising front, rear and side walls, a top panel having two apertures therethrough, a transverse partition extending between said front, side and rear walls to define a flue space below said top panel, a vent for said flue space, said partition being formed with apertures aligned with said top panel apertures, a layer of insulating material extending over the top and sides of said flue space, a burner plate of inverted cup shape seated in one of said top panel apertures and having a depending tubular perforated side wall extending in said flue space, a gas burner at the opening of said burner plate, an insulated open-ended tubular structure seated in one of said partition apertures below the other top panel aperture and having an upper perforated portion extending to said top panel, a removable cover for said other top panel aperture, a second burner plate of inverted cup shape disposed in said tubular structure in spaced relationship thereto and having a depending tubular perforated side wall extending within and spaced from said tubular structure, a second gas burner at the opening of said second burner plate, thermosensitive elements in said burner plates, and means controlled by said thermosensitive elements for regulating the gas supplies to said burners.

5. A gas range of cabinet form comprising front, rear and side walls, a top panel having a plurality of apertures therethrough, a transverse partition extending between said front, side and rear walls to define a flue space below said top panel, a vent for said flue space, said partition being formed with apertures aligned with said top panel apertures, a layer of insulating material extending over the top and sides of said flue space, an insulated oven structure below said partition, a transverse partition subdividing said oven into upper and lower compartments, a vent conduit within the oven insulation connecting said lower compartment with said flue space, a gas burner in said lower compartment, an open-ended insulated tubular well structure seated in one of said partition apertures and having an upper perforated portion extending to said top panel outside the top panel aperture aligned therewith, an inverted cup-shaped burner plate having a tubular perforated depending side wall disposed in said well structure in spaced relationship thereto, a tubular member having an upper radial flange attached to said upper portion of said well structure above the perforations therein, said tubular member extending downwardly at least to the margin of said burner plate, a removable cover for the top panel aperture above said well structure, a gas burner at the opening of said burner plate, a second inverted cup-shaped burner plate having a tubular depending perforated side wall seated in another top panel aperture with said side wall extending in said flue space, a second gas burner at the opening of said burner plate, thermosensitive elements in said burner plates, and means controlled by said thermosensitive element for regulating the gas supplies to said gas burners at the openings of said burner plates.

References Cited in the file of this patent

UNITED STATES PATENTS

| | | |
|---|---|---|
| 1,420,688 | De Laitte | Jan. 7, 1922 |
| 1,493,204 | Humphrey | Nov. 6, 1924 |
| 1,562,388 | Taylor | Nov. 17, 1925 |
| 1,699,624 | O'Dowd | Jan. 22, 1929 |
| 1,922,420 | Coulston | Aug. 15, 1933 |
| 1,934,127 | Jones | Nov. 7, 1933 |
| 1,978,544 | Maul | Oct. 30, 1934 |
| 2,200,180 | Kullberg | May 7, 1940 |
| 2,350,500 | Eltz | June 6, 1944 |
| 2,400,643 | Hermann | May 21, 1946 |
| 2,531,462 | Phares | Nov. 28, 1950 |
| 2,595,527 | Kells | May 6, 1952 |

FOREIGN PATENTS

| | | |
|---|---|---|
| 599,860 | Great Britain | Mar. 23, 1948 |
| 254,486 | Switzerland | May 15, 1948 |